United States Patent
Moxey et al.

(10) Patent No.: US 10,494,295 B2
(45) Date of Patent: Dec. 3, 2019

(54) ANTI-REFLECTION COATING

(71) Applicants: AGENCY FOR SCIENCE, TECHNOLOGY AND RESEARCH, Singapore (SG); WANGI INDUSTRIAL CO. PTE LTD, Singapore (SG)

(72) Inventors: Mark Allen Moxey, Singapore (SG); Mohamed Sultan Mohiddin Saifullah, Singapore (SG); Karen Siew Ling Chong, Singapore (SG); Tian Poh Khoo, Singapore (SG); Ker Yee Chew, Singapore (SG); Li Kang Cheah, Singapore (SG)

(73) Assignees: AGENCY FOR SCIENCE, TECHNOLOFY AND RESEARCH, Singapore (SG); WANGI INDUSTRIAL CO. PTE LTD, Singapore (SG)

( * ) Notice: Subject to any disclaimer, the term of this patent is extended or adjusted under 35 U.S.C. 154(b) by 160 days.

(21) Appl. No.: 15/549,143

(22) PCT Filed: Feb. 4, 2016

(86) PCT No.: PCT/SG2016/050059
§ 371 (c)(1),
(2) Date: Aug. 4, 2017

(87) PCT Pub. No.: WO2016/126210
PCT Pub. Date: Aug. 11, 2016

(65) Prior Publication Data
US 2018/0037495 A1    Feb. 8, 2018

(30) Foreign Application Priority Data
Feb. 4, 2015  (SG) .......................... 10201500867Y

(51) Int. Cl.
*C03C 17/30* (2006.01)
*C03C 17/34* (2006.01)
(Continued)

(52) U.S. Cl.
CPC .......... *C03C 17/30* (2013.01); *C03C 17/3405* (2013.01); *C09D 183/04* (2013.01);
(Continued)

(58) Field of Classification Search
CPC . C03C 17/30; C03C 17/3405; C03C 2217/73; C03C 2217/732; C08G 77/045; C08G 77/20; C09D 183/04
See application file for complete search history.

(56) References Cited

U.S. PATENT DOCUMENTS

2011/0196059 A1* 8/2011 Nagai ................. C07F 7/21
522/172

FOREIGN PATENT DOCUMENTS

| CA | 2324794 A1 | 4/2002 |
| WO | WO 2004/104113 A1 | 12/2004 |

(Continued)

OTHER PUBLICATIONS

Raut, H.K., Dinachali, S.S., He., A.Y., Ganesh, A., Saifullah, M.S.M., Law, J., Ramakrishna, S., "Robust and Durable Polyhedral Oligomeric Silsesquioxane-Based Anti-Reflective Nanostructures with Broadband Quasi-Omnidirectional Properties", Energy Environ. Sci., 2013 (Year: 2013).*

(Continued)

*Primary Examiner* — James C Goloboy
(74) *Attorney, Agent, or Firm* — Womble Bond Dickinson (US) LLP

(57) ABSTRACT

This invention relates to a UV-curable coating material comprising an organosilica compound such as POSS or octahedral oligomeric silsesquioxane which is functional-
(Continued)

ized with a UV-curable functional group. The material further comprises at least one UV-curable cross-linker. The coating material comprises surface structures in the nano-sized range and can be used in a nanoimprint coating process where the material is coated on a substrate such as glass and a mold is pressed against the material to form an imprint before curing by UV radiation.

19 Claims, 6 Drawing Sheets

(51) Int. Cl.
*C09D 183/04* (2006.01)
*C08G 77/04* (2006.01)
*C08G 77/20* (2006.01)

(52) U.S. Cl.
CPC .... *C03C 2217/73* (2013.01); *C03C 2217/732* (2013.01); *C08G 77/045* (2013.01); *C08G 77/20* (2013.01)

(56) References Cited

FOREIGN PATENT DOCUMENTS

WO WO 2013/148031 A1 10/2013
WO WO 2016/018918 A1 2/2016

OTHER PUBLICATIONS

IP Office of Singapore—Notification of Transmittal of the International Search Report and the Written Opinion of the International Searching Authority, or the Declaration, along with the International Search Report and Written Opinion dated Aug. 3, 2016 for International Application No. PCT/SG2016/050059, 13 pages.
IP Office of Singapore—International Preliminary Report on Patentability for International Application No. PCT/SG2016/050059, including the Response to the Written Opinion under Article 34 dated Nov. 24, 2016, 16 pages.
Kim, Y., et al., "Organic Thin-Film Transistors Using Photocurable Acryl-Functionalized Polyhedral Oligomeric Silsesquinoxanes as Gate Dieletrics," *Synthetic Metals*, Oct. 13, 2012, vol. 162, pp. 1798-1803 (6 pages).
Raut, H.K., et al., "Robust and Durable Polyhedral Oligomeric SilsesquIoxane-Based Anti-Reflective Nanostructures with Broadband Quasi-Omnidirectional Properties," *Engery Environ. Sci.*, Apr. 12, 2013, vol. 6, pp. 1929-1937 (9 pages).
Shin, J.H, et al., "Fabrication of Functional Nanosized Patterns with UV-curable Polysilsesquioxane on Photovoltic Protective Glass Substrates using Hybrid Nano-imprint Lithography," *Dept of Mat Sci and Engg*, Apr. 23, 2014, vol. 2, pp. 5864-5869 (6 pages).

* cited by examiner

[Fig. 1]
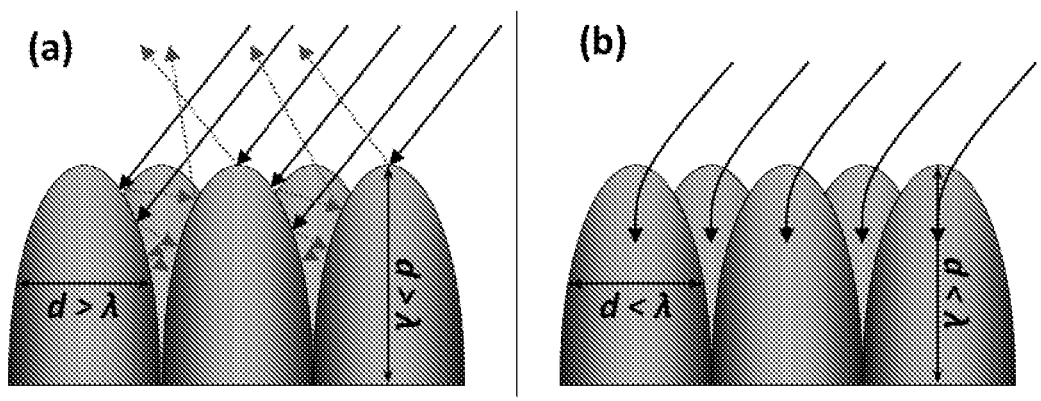

[Fig. 2]
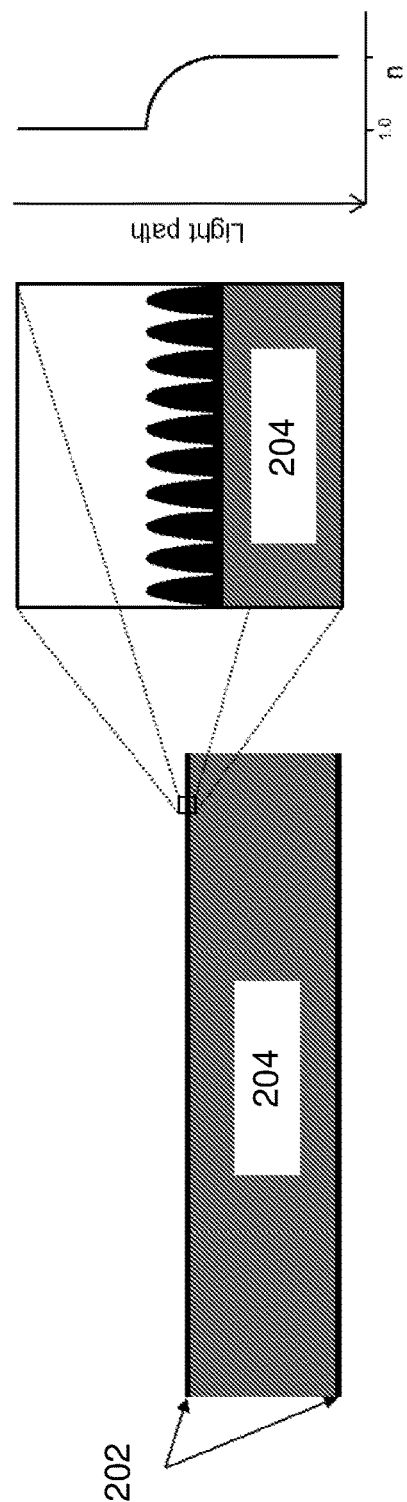

[Fig. 3]
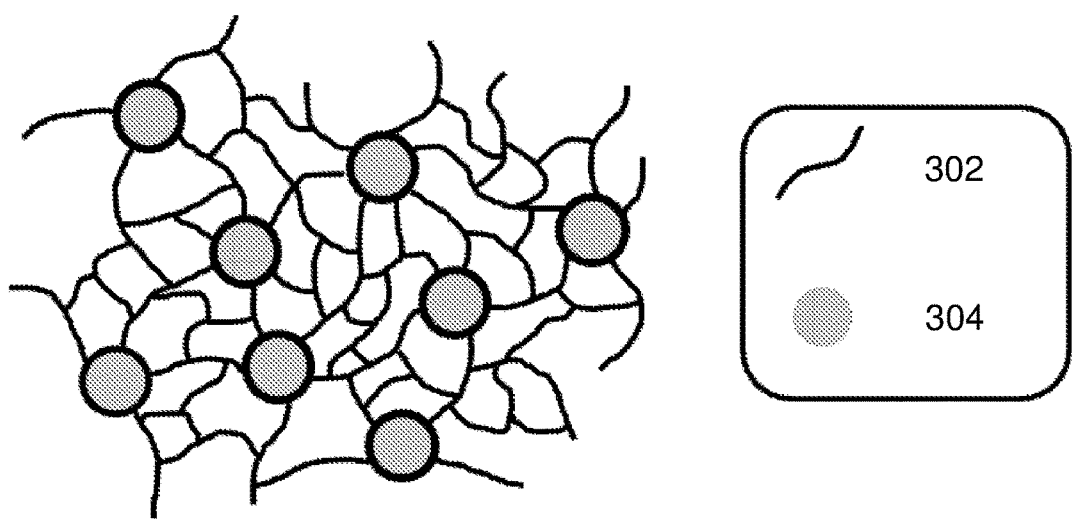

[Fig. 4]
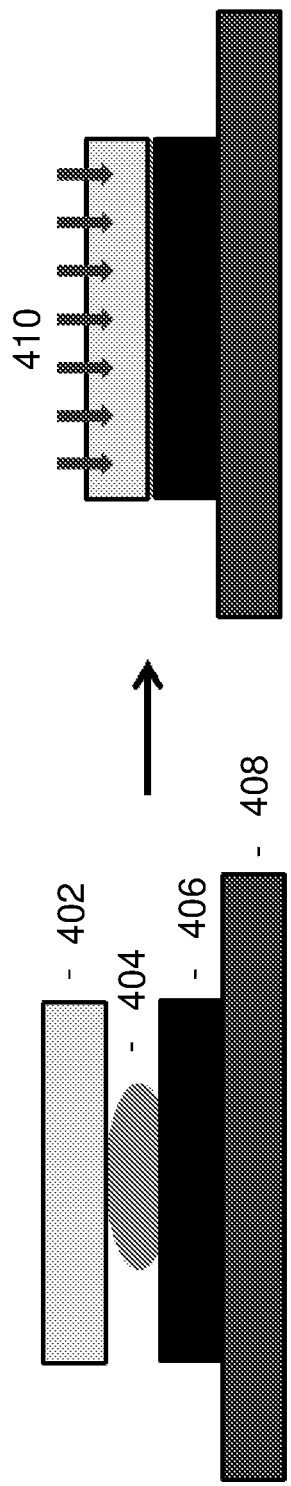

[Fig. 5]
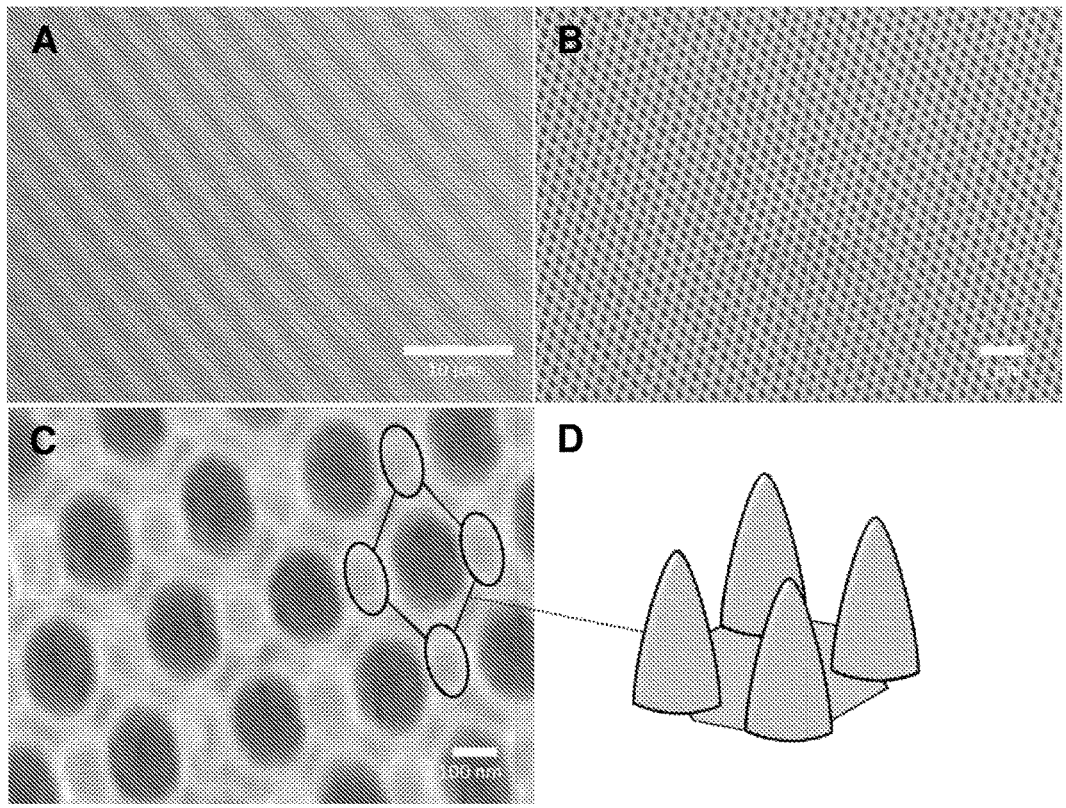
[Fig. 6]

[Fig. 7]
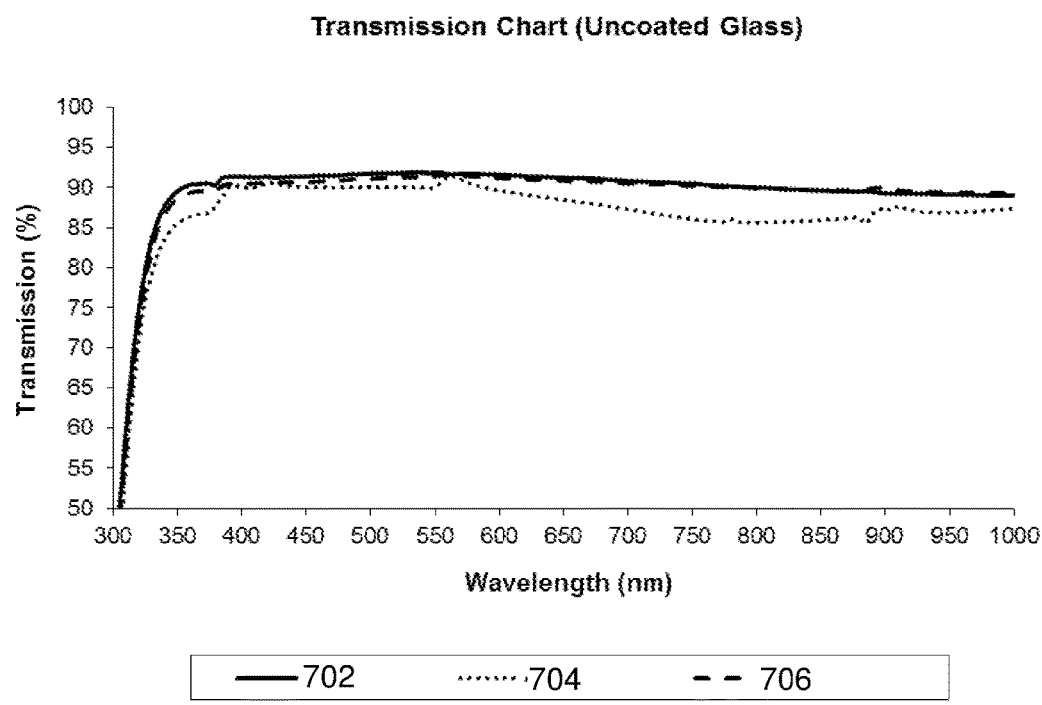
[Fig. 8]
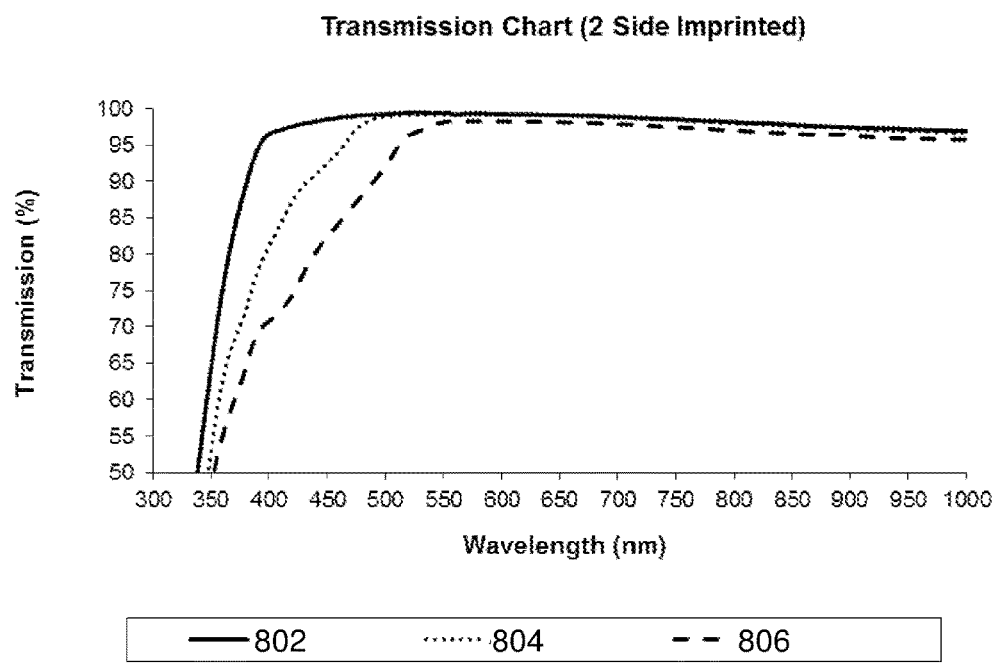

ANTI-REFLECTION COATING

CROSS-REFERENCE TO RELATED APPLICATIONS

This patent application is a U.S. National Phase application under 35 U.S.C. § 371 of International Application No. PCT/SG2016/050059, filed on Feb. 4, 2016, entitled ANTI-REFLECTION COATING, which claims priority from Singapore Patent Application No. 10201500867Y, filed on Feb. 4, 2015.

TECHNICAL FIELD

The present invention relates to an anti-reflective coating, an antireflective material comprising a substrate coated with the coating material and the method of making the antireflective material.

BACKGROUND ART

The optical phenomenon, reflection, is a product of the change in medium in which the light is travelling. The medium is characterized optically by its refractive index (n), which quantifies the speed of light in that medium with respect to a vacuum. The mediums, of which most systems are concerning, are air and glass and have n values of ca. 1 and 1.5 respectively. The fraction of light being reflected as the light passes between two mediums can be calculated using the Fresnel equation:

$$r = \left(\frac{n_o - n_s}{n_o + n_s}\right)^2 \qquad \text{[MATH. 1]}$$

where $n_o$ is the refractive index (RI) of the first medium (air) and $n_s$ is the RI of the second medium (glass). The main strategies for reducing reflectance are to either; reduce the difference between the RI of the glass and air mediums by addition of a material with a RI value somewhere in between them (optimum RI 1.22); or to employ a coating with thickness $\lambda/4$ for a specific wavelength resulting in deconstructive interference of the reflected material. The most common antireflective coating (ARC), which is made from $MgF_2$, usually employs both strategies. It has an RI of 1.38, which although is higher than the optimum value, no other known material combines a lower RI with the same degree of durability. Subsequently, by controlling the thickness of the coating to be $\lambda/4$, the $MgF_2$ can provide sufficient anti-reflectance over a broad range of wavelengths relative to $\lambda$.

Effective ARCs can be categorised into two forms; homogeneous and inhomogeneous. The two types can exist as single layer multi-stacks as well as patterned subwavelength structures (SWS). Single layer homogenous forms are limited in their ability to reduce reflectance and must have a controlled thickness of $\lambda/4$ to become a practical option. Single layer inhomogeneous forms, which possess a gradient refractive index (GRIN) are most effective in suppressing the Fresnel reflections at an interface. They impart anti-reflective property to an interface not only over a broad spectral range but also over wider angles of incidence. Conventionally, a gradient refractive index (GRIN) has been achieved by depositing multiple layers of materials of successively reducing refractive index. However, multi-layer ARCs often deteriorate over time because of the debonding caused by thermal mismatch and poor interfacial adhesion. Incompatible mechanical and thermal properties of polymer antireflective surfaces and their durability pose major operational challenges for applications of GRIN.

There is therefore a need to provide a coating material and antireflective material comprising a substrate coated with the coating material that overcomes or at least ameliorates, one or more of the disadvantages described above.

SUMMARY

According to the disclosure, fabrication of a highly durable and mechanically superior anti-reflective coating (ARC) by nanoimprint lithography of polyhedral oligomeric silsesquioxane-based (POSS) material on a glass substrate is demonstrated.

In an aspect, there is provided a UV-curable coating material for a nanoimprint coating process comprising an organosilica compound having a UV-curable functional group and at least one UV-curable cross-linker.

Advantageously, the UV-curable coating material may comprise an organosilica compound such as polyhedral oligomeric silsesquioxane (POSS). The inclusion of POSS may dramatically enhance its properties resulting in oxidation resistance, surface hardening, flammability reduction and mechanically improved hybrids. POSS may enhance the mechanical strength and stability, durability and adherence to a substrate. POSS may enhance the mechanical and chemical robustness of the coating.

Further advantageously, the coating material may comprise UV-curable cross-linking groups. The UV-curable cross-linking groups may enhance the hardness of the cured coating and reduce the brittleness of the cured coating. The UV-curable cross-linking groups may be acrylates, including diacrylates triacrylates and tetraacrylates. The hardness of the cured coating may be enhanced by the use of acrylates such as tetraacrylates. Further advantageously, the harness of the cured coating may be further increased by using mercapto reagents to reduce oxygen inhibition when being cured.

Advantageously, by having both an organosilica compound and UV-curable cross-linking groups in the coating material, the cured coating may be harder and less brittle compared to conventional ARCs.

In another aspect, there is provided a coating comprising an organosilica compound cross-linked by at least one UV-curable cross-linker, wherein the coating comprises surface structures in the nano-sized range.

Advantageously, the present disclosure provides a durable, chemically and thermally stable high-performance ARC on glass. Advantageously, the ARC coating may be produced by fabricating an array of topographical structures that can impart new functionalities to a material without chemically altering it. These imprinted structures may be bio-inspired and can mimic such effects as self-cleaning (lotus leaf), dry adhesion (gecko-foot), colour (butterfly wings) and anti-reflection (moth-eye).

Advantageously, the ARC may be achieved by creating gradient refractive index (GRIN) on the surface of the glass. Nanostructures emulating the moth's eye morphology may confer the advantages of GRIN such as broadband and quasi-omnidirectional antireflective properties. Moth's eye nanostructures being monolithic and comprising a single material may be robust. The graded transition in refractive index in the corneal lens of moth's eye may be attributed to the presence of hexagonally packed arrays of sub-200 nm protuberances. The individual structures may be shaped like cones and are close packed, so that they are joined at the base. Advantageously, since these subwavelength protuberances are closely packed, incident light may interact with them fully rather than resolving them structurally. Due to this interaction of light waves with what effectively appears to be a smooth transition in refractive index from air to substrate due to the moth's eye nanostructures at the interface, transmittance of incident light with wavelength larger than the spacing period may be greatly enhanced.

Advantageously, the dimensions of the structures may be less than the wavelength of light that is required to be transmitted. This may circumvent the issue that if the structures are larger than the wavelength of the incident light, the light will interact with the structures individually and a proportion of that light will be reflected and scattered. Advantageously, when the structures are smaller than the wavelength of the incident light, then the light may interact with the structures wholly, thereby treating it as a medium of gradually increasing RI. If the structured media and the substrate media are made from different materials, then it may be advantageous for the material of the structures (in bulk form) and the material of the substrate to have the same RI, so to limit the reflection at the interface between the two materials.

Further advantageously, nanoimprinting lithography (NIL) is a surface patterning technique that may offer resolutions anywhere from several hundred microns down to about 5 nm. NIL may involve transferring surface relief from a template to a thin film on a substrate by embossing onto the thin film. Advantageously, UV-assisted NIL may use UV-curable monomers. UV imprinting may utilise materials that may be cured by UV exposure. In comparison to optical lithography, NIL may be simple and economical and may offer extremely good resolution with relatively faster replication.

Further advantageously, UV-curing may offer increased hardness of the coating when cured, compared to resins that are thermally cured. Further advantageously, the cross-linking between the organosilica compound such as POSS having a UV-curable functional group and the UV-curable cross-linkers may facilitate covalent bond formation between the POSS monomer units thus avoiding any macrophase separation by possible agglomeration of the POSS units. The inclusion of POSS may dramatically enhance its properties resulting in oxidation resistance, surface hardening, flammability reduction and mechanically improved hybrids. POSS may enhance the mechanical strength and stability, durability and adherence to a substrate.

Advantageously, the coating of the present disclosure may allow transmission of visible light of up to 99.4%, thereby minimising reflectance. Further advantageously, the coating may have a hardness of up to 8H on a pencil hardness test, thereby having improved anti-scratch properties. Further advantageously, the coating of the present disclosure may have higher transmission and lower reflectance measurements compared to conventional ARCs. More advantageously, the improved properties of the coating may be due to the formulation of the coating material, the imprinting process or a combination of both.

Further advantageously, the use of sub-wavelength structures instead of thin films to produce antireflective coatings may allow higher transmission of light over a broader range of incidence angles.

In another aspect, there is provided an anti-reflective material comprising a substrate coated with the coating material as defined above.

In yet another aspect, there is provided an anti-reflective material comprising a substrate coated with the coating as defined above.

Advantageously, the coating or the coating material may be coated on one side of the substrate or both sides of the substrate. Further advantageously, if the coating material or coating is coated on both sides of the substrate, then anti-reflective properties may be conferred in both directions of light transmission.

In a further aspect, there is provided a method of synthesizing the anti-reflective material as defined above, comprising the steps of: providing a substrate; coating the substrate with the coating material as defined above; pressing a mold against the coating material to form a nano-sized imprint thereon; and curing with UV-radiation.

Advantageously, the method may be easy to upscale, as it may be roll-to plate processable. This may overcome the limitation of conventional methods such as when thermal curing is used, which would limit the method to relatively small substrates (less than 4 inch substrates) and only to batch style processes. Further advantageously, the use of UV-curing may enable curing of the coating within a duration of about 20 seconds to about 80 seconds, which is a significantly shorter period of time than the time it may take to cure the coating using conventional methods, for example, when thermal curing is used. This may facilitate faster manufacture of the coating and/or the antireflective material, and may enable the coating and antireflective material to be manufactured on a larger scale.

Definitions

The following words and terms used herein shall have the meaning indicated:

The term "curable" refers to the ability of a polymer material to be hardened or toughened by covalent cross-linking of polymer chains, brought about by chemical additives, ultraviolet radiation, electron beam or heat.

The term "UV-curable" refers to the ability of a polymer material to be hardened or toughened by covalent cross-linking of polymer chains, brought about by ultraviolet radiation.

The term "nanoimprint process" refers to a process to make coatings comprising imprinted surface structures in the nano-sized range.

The term "dimensions" for the purposes of the present disclosure, may refer to the height, width, diameter, peak-to-peak distance and any combination thereof of surface structures.

The term "polyhedral oligomeric silsequioxane" may be used interchangeably with its abbreviation, "POSS", and refers to an organosilicon compound with the chemical formula, $[RSiO_{3/2}]_n$, where R is H, alkyl, aryl or alkoxyl. Silsesquioxanes may have a molecular form with 6, 8, 10 and 12 Si vertices, as well as a polymer form. Each Si centre is bonded to three oxo groups, which in turn connect to other Si centres.

In the definitions of a number of substituents below it is stated that "the group may be a terminal group or a bridging group". This is intended to signify that the use of the term is intended to encompass the situation where the group is a linker between two other portions of the molecule as well as where it is a terminal moiety. Using the term alkyl as an example, some publications would use the term "alkylene" for a bridging group and hence in these other publications there is a distinction between the terms "alkyl" (terminal group) and "alkylene" (bridging group). In the present application no such distinction is made and most groups may be either a bridging group or a terminal group.

"Alkyl" as a group or part of a group refers to a straight or branched aliphatic hydrocarbon group, preferably a $C_1$-$C_{12}$ alkyl, more preferably a $C_1$-$C_{10}$ alkyl, most preferably $C_1$-$C_6$ unless otherwise noted. Examples of suitable straight and branched $C_1$-$C_6$ alkyl substituents include methyl, ethyl, n-propyl, 2-propyl, n-butyl, sec-butyl, t-butyl, hexyl, and the like. The group may be a terminal group or a bridging group.

"Alkyloxy" refers to an alkyl-O— group in which alkyl is as defined herein. Preferably the alkyloxy is a $C_1$-$C_6$alkyloxy. Examples include, but are not limited to, methoxy and ethoxy. The group may be a terminal group or a bridging group.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF OPTIONAL EMBODIMENTS

Exemplary, non-limiting embodiments of a polymer matrix will now be disclosed.

There is provided a UV-curable coating material for a nanoimprint coating process comprising an organosilica compound having a UV-curable functional group and at least one UV-curable cross-linker.

The nanoimprint coating process may produce surface structures that may be cone shaped.

The cones may have a diameter in the range of about 100 nm to about 350 nm, about 100 nm to about 150 nm, about 100 nm to about 200 nm, about 100 nm to about 250 nm, about 100 nm to about 300 nm, about 150 nm to about 200 nm, about 150 nm to about 250 nm, about 150 nm to about 300 nm, about 200 nm to about 250 nm, about 200 nm to about 300 nm, about 200 nm to about 350 nm, about 250 nm to about 300 nm, about 250 nm to about 350 nm or about 300 nm to about 350 nm.

The cones may have a height in the range of about 250 nm to about 390 nm, about 250 nm to about 300 nm, about 250 nm to about 350 nm, about 300 nm to about 350 nm, about 300 nm to about 390 nm or about 350 nm to about 390 nm.

The cones may have a peak-to-peak distance in the range of about 250 nm to about 330 nm, about 250 nm to about 270 nm, about 250 nm to about 290 nm, about 250 nm to about 310 nm, about 270 nm to about 290 nm, about 270 nm to about 310 nm, about 270 nm to about 330 nm, about 290 nm to about 310 nm, about 290 nm to about 330 nm or about 310 nm to about 330 nm.

The surface structures may have dimensions less than the wavelength of visible light.

The surface structures may have dimensions in the range of about 100 nm to about 390 nm, about 100 nm to about 150 nm, about 100 nm to about 200 nm, about 100 nm to about 250 nm, about 100 nm to about 300 nm, about 100 nm to about 350 nm, about 150 nm to about 200 nm, about 150 nm to about 250 nm, about 150 nm to about 300 nm, about 150 nm to about 350 nm, about 150 nm to about 390 nm, about 200 nm to about 250 nm, about 200 nm to about 300 nm, about 200 nm to about 350 nm, about 200 nm to about 390 nm, about 250 nm to about 300 nm, about 250 nm to about 350 nm, about 250 nm to about 390 nm, about 300 nm to about 350 nm, about 300 nm to about 390 nm or about 350 nm to about 390 nm.

The surface structures may be sub-200 nm protuberances.

The graded transition in refractive index in the corneal lens of moth's eye is attributed to the presence of hexagonally packed arrays of such sub-200 nm protuberances. The individual structures are shaped like cones and are close packed, so that they are joined at the base. Close packed structures are optimum because the density of the material at the base of the structures should be as close to the bulk material as possible in order to avoid an abrupt change in refractive index, which would consequently cause reflection. Advantageously, since these subwavelength protuberances are closely packed, incident light interacts with them fully rather than resolving them structurally. Due to this interaction of light waves with what effectively appears to be a smooth transition in refractive index from air to substrate due to the moth's eye nanostructures at the interface, transmittance of incident light with wavelength larger than the spacing period is greatly enhanced. This is further described in FIG. 1, where (a) shows when d (dimensions of the structures in all dimensions including height and width) is greater than λ (wavelength of visible light) (i.e. d>λ). The incident light will interact with the structures individually resulting in reflection and scattering. In contrast, (b) shows when d<λ where the incident light interacts with the nanostructures wholly, thereby treating the medium as a gradient refractive index. If any dimension of the structure is larger than the wavelength of visible light, it would cause the light to scatter and would decrease transmittance.

The coating material may have a thickness in the range of about 400 nm to about 2400 nm, about 400 nm to about 600 nm, about 400 nm to about 800 nm, about 400 nm to about 1000 nm, about 400 nm to about 1200 nm, about 400 nm to about 1400 nm, about 400 nm to about 1600 nm, about 400 nm to about 1800 nm, about 400 nm to about 2000 nm, about 400 nm to about 2200 nm, about 400 nm to about 2400 nm, about 600 nm to about 800 nm, about 600 nm to about 1000 nm, about 600 nm to about 1200 nm, about 600 nm to about 1400 nm, about 600 nm to about 1600 nm, about 600 nm to about 1800 nm, about 600 nm to about 2000 nm, about 600 nm to about 2200 nm, about 600 nm to about 2400 nm, about 800 nm to about 1000 nm, about 800 nm to about 1200 nm, about 800 nm to about 1400 nm, about 800 nm to about 1600 nm, about 800 nm to about 1800 nm, about 800 nm to about 2000 nm, about 800 nm to about 2200 nm, about 800 nm to about 2400 nm, about 1000 nm to about 1200 nm, about 1000 nm to about 1400 nm, about 1000 nm to about 1600 nm, about 1000 nm to about 1800 nm, about 1000 nm to about 2000 nm, about 1000 nm to about 2200 nm, about 1000 nm to about 2400 nm, about 1200 nm to about 1400 nm, about 1200 nm to about 1600 nm, about 1200 nm to about 1800 nm, about 1200 nm to about 2000 nm, about 1200 nm to about 2200 nm, about 1200 nm to about 2400, about 14000 nm, to about 1600 nm, about 1400 nm to about 1800 nm, about 1400 nm to about 2000 nm, about 1400 nm to about 2200 nm, about 1400 nm to about 2400 nm, about 1600 nm to about 1800 nm, about 1600 nm to about 2000 nm, about 1600 nm to about 2200 nm, about 1600 nm to about 2400 nm, about 1800 nm to about 2000 nm, about 1800 nm to about 2200 nm, about 1800 nm to about 2400 nm, about 2000 nm to about 2200 nm, about 2000 nm to about 2400 nm or about 2200 nm to about 2400 nm.

The coating material may comprise one, two or three UV-curable cross-linkers.

The coating material may comprise a photoinitiator.

The organosilica compound having the curable functional group may be present at an amount in the range of about 5 wt % to 45 wt %, about 5 wt % to about 10 wt %, about 5 wt % to about 15 wt %, about 5 wt % to about 30 wt %, about 5 wt % to about 40 wt %, about 5 wt % to about 45 wt %, about 10 wt % to about 15 wt %, about 10 wt % to about 30 wt %, about 10 wt % to about 40 wt %, about 10 wt % to about 45 wt %, about 15 wt % to about 30 wt %, about 15 wt % to about 40 wt %, about 15 wt % to about 45 wt %, about 30 wt % to about 40 wt %, about 30 wt % to about 45 wt % or about 40 wt % to about 45 wt %. The organosilica having a UV-curable functional group may be present in an amount in the range of about 30 wt % to about 40 wt %.

The cross-linker may be present in an amount in the range of about 0 wt % to about 75 wt %, about 0 wt % to about 10 wt %, about 0 wt % to about 20 wt %, about 0 wt % to about 30 wt %, about 0 wt % to about 40 wt %, about 0 wt % to about 50 wt %, about 0 wt % to about 60 wt %, about 0 wt % to about 70 wt %, about 10 wt % to about 20 wt %, about 10 wt % to about 30 wt %, about 10 wt % to about 40 wt %, about 10 wt % to about 50 wt %, about 10 wt % to about 60 wt %, about 10 wt % to about 70 wt %, about 10 wt % to about 75 wt %, about 20 wt % to about 30 wt %, about 20 wt % to about 40 wt %, about 20 wt % to about 50 wt %, about 20 wt % to about 60 wt %, about 20 wt % to about 70 wt %, about 20 wt % to about 75 wt %, about 30 wt % to about 40 wt %, about 30 wt % to about 50 wt %, about 30 wt % to about 60 wt %, about 30 wt % to about 70 wt %, about 30 wt % to about 75 wt %, about 40 wt % to about 50 wt %, about 40 wt % to about 60 wt %, about 40 wt % to about 70 wt %, about 40 wt % to about 75 wt %, about 50 wt % to about 60 wt %, about 50 wt % to about 70 wt %, about 50 wt % to about 75 wt %, about 60 wt % to about 70 wt %, about 60 wt % to about 75 wt % or about 70 wt % to about 75 wt %. The cross-linker may be present in an amount in the range of about 0 wt % to about 30 wt %, about 30 wt % to about 65 wt % or about 0 wt % to about 65 wt %.

The photoinitiator may be present at an amount in the range of about 1 wt % to about 10 wt %, about 1 wt % to about 2 wt %, about 1 wt % to about 4 wt %, about 1 wt % to about 6 wt %, about 1 wt % to about 8 wt %, about 2 wt % to about 4 wt %, about 2 wt % to about 6 wt %, about 2 wt % to about 8 wt %, about 2 wt % to about 10 wt %, about 4 wt % to about 6 wt %, about 4 wt % to about 8 wt %, about 4 wt % to about 10 wt %, about 6 wt % to about 8 wt %, about 6 wt % to about 10 wt %, or about 8 wt % to about 10 wt %. The photoinitiator may be present at an amount in the range of about 2 wt % to about 10 wt %.

The coating material may further comprise plasticizers such as mono-acrylate reagents or isobornyl acrylate (IBA). The plasticizer may reduce the stress of the cured resist, and consequently increase adhesion to the substrate.

The plasticizer may be present at an amount in the range of about 0 wt % to about 75 wt %, about 0 wt % to about 10 wt %, about 0 wt % to about 20 wt %, about 0 wt % to about 30 wt %, about 0 wt % to about 40 wt %, about 0 wt % to about 50 wt %, about 0 wt % to about 60 wt %, about 0 wt % to about 70 wt %, about 10 wt % to about 20 wt %, about 10 wt % to about 30 wt %, about 10 wt % to about 40 wt %, about 10 wt % to about 50 wt %, about 10 wt % to about 60 wt %, about 10 wt % to about 70 wt %, about 10 wt % to about 75 wt %, about 20 wt % to about 30 wt %, about 20 wt % to about 40 wt %, about 20 wt % to about 50 wt %, about 20 wt % to about 60 wt %, about 20 wt % to about 70 wt %, about 20 wt % to about 75 wt %, about 30 wt % to about 40 wt %, about 30 wt % to about 50 wt %, about 30 wt % to about 60 wt %, about 30 wt % to about 70 wt %, about 30 wt % to about 75 wt %, about 40 wt % to about 50 wt %, about 40 wt % to about 60 wt %, about 40 wt % to about 70 wt %, about 40 wt % to about 75 wt %, about 50 wt % to about 60 wt %, about 50 wt % to about 70 wt %, about 50 wt % to about 75 wt %, about 60 wt % to about 70 wt %, about 60 wt % to about 75 wt % or about 70 wt % to about 75 wt %.

The coating material may further comprise surfactants such as mono(methacryloxypropyl)-terminated polydimethylsiloxane (Siloxane oil). The surfactant may reduce the surface energy of the cured resist, making it more hydrophobic and therefore more water resistant.

The surfactant may be present at an amount in the range of about 0 wt % to about 5 wt %, about 0 wt % to about 1 wt %, about 0 wt % to about 2 wt %, about 0 wt % to about 4 wt %, about 1 wt % to about 2 wt %, about 1 wt % to about 3 wt %, about 1 wt % to about 4 wt %, about 1 wt % to about 5 wt %, about 2 wt % to about 3 wt %, about 2 wt % to about 4 wt %, about 2 wt % to about 5 wt %, about 3 wt % to about 4 wt %, about 3 wt % to about 5 wt % or about 4 wt % to about 5 wt %.

The coating material may have a total wt % of 100%. The total wt % of the organosilica compound having the curable functional group and cross-linker may be 100%. The total wt % of the organosilica compound having the curable functional group, the cross-linker and the photoinitiator may be 100%. The total wt % of the organosilica compound having the UV-curable functional group, the cross-linker, the photoinitiator and the plasticizer may be 100%.

The total wt % of the organosilica compound having the UV-curable functional group, the cross-linker, the photoinitiator, the plasticizer and the surfactant may be 100%.

The organosilica compound may be polyhedral oligomeric silsesquioxane (POSS). POSS may embody a hybrid cage structure with the inner framework comprising silicon and oxygen. Polyhedral oligomeric silsesquioxane (POSS) may have the chemical formula $[RSiO_{3/2}]_n$, where R is H, alkyl, aryl or alkoxyl. Silsesquioxanes may have a molecular form with 6, 8, 10 and 12 Si vertices, as well as a polymer form. Each Si centre is bonded to three oxo groups, which in turn connect to other Si centres.

The external architecture of POSS may be modified by adding pendant groups such as acrylate and methacrylate to make the molecule polymerizable in the presence of a cross-linker and an initiator. Cross-linking may facilitate covalent bond formation between the POSS monomer units thus avoiding any macrophase separation by possible agglomeration of the POSS units. The inclusion of POSS may dramatically enhance its properties resulting in oxidation resistance, surface hardening, flammability reduction and mechanically improved hybrids. POSS may enhance the mechanical strength and stability, durability and adherence to a substrate. POSS may enhance the mechanical and chemical robustness of the coatings.

The polyhedral oligomeric silsesquioxane (POSS) may be an octahedral oligomeric silsesquioxane.

Octahedral oligomeric silsesquioxane may have the formula $[RSiO_{3/2}]_8$, or equivalently $R_8Si_8O_{12}$.

The UV-curable functional group may allow for UV curing when the coating formed from the disclosed coating composition is subjected to UV radiation.

The UV-curable functional group may be selected from the group consisting of acrylate, methacrylate, maleate, styrene, epoxy, vinyl ether and any mixture thereof.

The UV-curable functional group may be an alkyl methacrylate or an alkyl acrylate. Alkyl as a group or part of a group may refer to a straight or branched aliphatic hydrocarbon group, preferably a $C_1$-$C_{12}$ alkyl, more preferably a $C_1$-$C_{10}$ alkyl, most preferably $C_1$-$C_6$. Examples of suitable straight and branched $C_1$-$C_6$ alkyl substituents may include methyl, ethyl, n-propyl, 2-propyl, n-butyl, sec-butyl, t-butyl, hexyl, and the like. The group may be a terminal group or a bridging group.

The UV-curable functional group may be selected from the group consisting of acrylopropyl, methyl methacrylate, ethyl methacrylate, propyl methacrylate, butyl methacrylate, pentyl methacrylate, methyl acrylate, ethyl acrylate, propyl acrylate, butyl acrylate and pentyl acrylate.

The UV-curable functional group may be ethyl mechacrylate.

The organosilica compound having a UV-curable functional group may be MA0735-Methacrylate POSS cage.

The UV-curable cross-linker may be a diacrylate, triacrylate, tetraacrylate or any mixture thereof.

The UV-curable cross-linker may be selected from the group consisting of 1,6-hexanediol diacrylate (HDA), pentaerythritol tetraacrylate (PTA), pentaerythritol tetrakis(3-mercaptopropionate) (PTM), trimethylolpropane tris(3-mercaptopropionate) and any mixture thereof.

The UV-curable cross-linker may be a mixture of 1,6-hexanediol diacrylate (HDA) and pentaerythritol tetraacrylate (PTA).

The UV-curable cross-linker may be a mixture of 1,6-hexanediol diacrylate and pentaerythritol tetrakis(3-mercaptopropionate) (PTM).

1,6-hexanediol diacrylate (HDA) may be a reactive diluent. 1,6-hexanediol diacrylate may reduce the viscosity of the uncured coating material. 1,6-hexanediol diacrylate may also reduce the brittleness of the cured coating if the ratio between 1,6-hexanediol diacrylate and the tetraacrylate is increased.

Pentanedioltetraacrylate (PTA) may increase cross-linking Pentanedioltetraacrylate may enhance the hardness of the cured coating.

Pentaerythritol tetrakis(3-mercaptopropionate) (PTM) may increase cross-linking Pentaerythritol tetrakis(3-mercaptopropionate) may enhance the hardness of the cured coating. Pentaerythritol tetrakis(3-mercaptopropionate) may have a side-reaction when being cured which may help to tolerate oxygen retardation, allowing the resin to be cured in air. Since PTM may have a side-reaction that may help tolerate oxygen retardation, it may improve the curing of the coating around the edges of the imprint, where the coating is most exposed to oxygen from air. The pentaerythritol tetrakis(3-mercaptopropionate) may improve the hardness, substrate adhesion, ability of the resin to cure in air and the hydrophobicity of the resin.

The 1,6-hexanediol diacrylate (HDA) may be present in an amount in the range of about 25 wt % to about 70 wt %, about 25 wt % to about 30 wt %, about 25 wt % to about 35 wt %, about 25 wt % to about 40 wt %, about 25 wt % to about 45 wt %, about 25 wt % to about 50 wt, about 25 wt % to about 55 wt %, about 25 wt % to about 60 wt %, about 25 wt % to about 65 wt %, about 30 wt % to about 35 wt %, about 30 wt % top about 40 wt %, about 30 wt % to about 45 wt %, about 30 wt % to about 50 wt %, about 30 wt % to about 55 wt %, about 30 wt % to about 60 wt %, about 30 wt % to about 65 wt %, about 30 wt % to about 70 wt %, about 35 wt % to about 40 wt %, about 35 wt % to about 45 wt %, about 35 wt % to about 50 wt %, about 35 wt % to about 55 wt %, about 35 wt % to about 60 wt %, about 35 wt % to about 65 wt %, about 35 wt % to about 70 wt %, about 40 wt % to about 45 wt %, about 40 wt % to about 50 wt %, about 40 wt % to about 55 wt %, about 40 wt % to about 60 wt %, about 40 wt % to about 65 wt %, about 40 wt % to about 70 wt %, about 45 wt % to about 50 wt %, about 45 wt % to about 55 wt %, about 45 wt % to about 60 wt %, about 45 wt % to about 65 wt %, about 45 wt % to about 70 wt %, about 50 wt % to about 55 wt %, about 50 wt % to about 60 wt %, about 50 wt % to about 65 wt %, about 50 wt % to about 70 wt %, about 55 wt % to about 60 wt %, about 55 wt % to about 65 wt %, about 55 wt % to about 70 wt %, about 60 wt % to about 65 wt %, about 60 wt % to about 70 wt %, or about 65 wt % to about 70 wt %. HDA may be present in the range of about 30 wt % to about 65 wt % or 45 wt % to about 55 wt %.

The pentaerythritol tetraacrylate (PTA) may be present in an amount in the range of about 0 wt % to about 30 wt %, about 1 wt % to about 2 wt %, about 1 wt % to about 5 wt %, about 1 wt % to about 10 wt %, about 1 wt % to about 15 wt %, about 1 wt % to about 20 wt %, about 1 wt % to about 25 wt %, about 2 wt % to about 5 wt %, about 2 wt % to about 10 wt %, about 2 wt % to about 15 wt %, about 2 wt % to about 20 wt %, about 2 wt % to about 25 wt %, about 2 wt % to about 30 wt %, about 5 wt % to about 10 wt %, about 5 wt % to about 15 wt %, about 5 wt % to about 20 wt %, about 5 wt % to about 25 wt %, about 5 wt % to about 30 wt %, about 10 wt % to about 15 wt %, about 10 wt % to about 20 wt %, about 10 wt % to about 25 wt %, about 10 wt % to about 30 wt %, about 15 wt % to about 20 wt %, about 15 wt % to about 25 wt %, about 15 wt % to about 30 wt %, about 20 wt % to about 25 wt %, about 20 wt % to about 30 wt %, or about 25 wt % to about 30 wt %. PTA may be present in the range of about 0 wt % to about 30 wt % or about 5 wt % to about 15 wt %.

The pentaerythritol tetrakis(3-mercaptopropionate) may be present in an amount in the range of about 0 wt % to about 30 wt %, about 1 wt % to about 2 wt %, about 1 wt % to about 5 wt %, about 1 wt % to about 10 wt %, about 1 wt % to about 15 wt %, about 1 wt % to about 20 wt %, about 1 wt % to about 25 wt %, about 2 wt % to about 5 wt %, about 2 wt % to about 10 wt %, about 2 wt % to about 15 wt %, about 2 wt % to about 20 wt %, about 2 wt % to about 25 wt %, about 2 wt % to about 30 wt %, about 5 wt % to about 10 wt %, about 5 wt % to about 15 wt %, about 5 wt % to about 20 wt %, about 5 wt % to about 25 wt %, about 5 wt % to about 30 wt %, about 10 wt % to about 15 wt %, about 10 wt % to about 20 wt %, about 10 wt % to about 25 wt %, about 10 wt % to about 30 wt %, about 15 wt % to about 20 wt %, about 15 wt % to about 25 wt %, about 15 wt % to about 30 wt %, about 20 wt % to about 25 wt %, about 20 wt % to about 30 wt %, or about 25 wt % to about 30 wt %. Pentaerythritol tetrakis(3-mercaptopropionate) may be present in the range of about 0 wt % to about 30 wt % or about 5 wt % to about 15 wt %.

The linker (HDA+PTA):POSS ratio may be in the range of about 13:1 to about 7:1, about 13:1 to about 12:1, about 13:1 to about 11:1, about 13:1 to about 10:1, about 13:1 to about 9:1, about 13:1 to about 8:1, about 12:1 to about 11:1, about 12:1 to about 10:1, about 12:1 to about 9:1, about 12:1 to about 8:1, about 12:1 to about 7:1, about 11:1 to about 10:1, about 11:1 to about 9:1, about 11:1 to about 8:1, about 11:1 to about 7:1, about 10:1 to about 9:1, about 10:1 to about 8:1, about 10:1 to about 7:1, about 9:1 to about 8:1, about 9:1 to about 7:1 or about 8:1 to about 7:1.

The photoinitiator may be 2-hydroxy-2-methylpropiophenone, 1-hydroxycyclohexyl phenyl ketone, 2-methylbenzophenone, methyl benzoylformate, 3-methylbenzophenone and any mixture thereof. A coating obtained from the coating material may comprise an organosilica compound cross-linked by at least one UV-curable cross-linker, wherein the coating comprises surface structures in the nano-sized range.

The coating may be cross-linked by one, two or three UV-curable cross-linkers.

An anti-reflective material may comprise a substrate coated with the coating material as defined above. It may be UV cured after coating.

The anti-reflective material may comprise an adhesion promoter between the substrate and the coating material.

The adhesion promoter may be any methacrylate or acrylate terminated alkylsiloxane.

The adhesion promoter may be 3-(trimethoxysilyl)propyl methacrylate (TPMA).

The adhesion promoter may be applied as a self assembled monolayer. The adhesion promoter may have a thickness relative to the length of the molecule in the range of about 1.5 nm to about 3.5 nm, about 1.5 nm to about 2 nm, about 1.5 nm to about 2.5 nm, about 1.5 nm to about 3 nm, about 2 nm to about 2.5 nm, about 2 nm to about 3 nm, about 2 nm to about 3.5 nm, about 2.5 nm to about 3 nm, about 2.5 nm to about 3.5 nm or about 3 nm to about 3.5 nm. The organosilica compound having a UV-curable functional group and the at least one UV-curable cross-linker of the coating material as defined above may be cross-linked with covalent bonds.

The substrate may be glass, a non-glass ceramic, metal or a polymer.

The substrate may be a glass sheet.

The coating material as defined above may be coated on one side of the glass sheet or both sides of the glass sheet.

An anti-reflective material may comprise a substrate coated with the coating as defined above. The anti-reflective material may comprise an adhesion promoter between the substrate and the coating.

The substrate may be a glass sheet.

The coating as defined above may be coated on one side of the glass sheet or both sides of the glass sheet.

A method of making the anti-reflective material as defined above may comprise the steps of: providing a substrate;
coating the substrate with the coating material as defined above;
pressing a mold against the coating material to form a nano-sized imprint thereon; and
curing with UV-radiation.

The method may comprise the step of coating the substrate with an adhesion promoter before coating with the coating material as defined above.

The mold may imprint nanostructures on the coating material. The mold may comprise silica, quartz, silicon, nickel, a polymer or any combination thereof. The mold may be hard, rigid, soft or flexible.

The mold may comprise structures having dimensions less than the wavelength of visible light.

The mold may comprise structures having a pitch in the range of about 150 nm to about 350 nm, about 150 nm to about 200 nm, about 150 nm to about 250 nm, about 150 nm to about 300 nm, about 200 nm to about 250 nm, about 200 nm to about 300 nm, about 200 nm to about 350 nm, about 250 nm to about 350 nm, about 250 nm to about 300 nm or about 300 nm to about 350 nm.

The mold may comprise structures having a height in the range of about 250 nm to about 390 nm, about 250 nm to about 300 nm, about 250 nm to about 350 nm, about 300 nm to about 350 nm, about 300 nm to about 390 nm or about 350 nm to about 390 nm.

The mold may comprise structures having a peak-to-peak distance in the range of about 250 nm to about 330 nm, about 250 nm to about 270 nm, about 250 nm to about 290 nm, about 250 nm to about 310 nm, about 270 nm to about 290 nm, about 270 nm to about 310 nm, about 270 nm to about 330 nm, about 290 nm to about 310 nm, about 290 nm to about 330 nm or about 310 nm to about 330 nm.

The curing step may result in the organosilica compound having a UV-curable functional group and the at least one UV-curable cross-linker of the coating material as defined above to crosslink with covalent bonds.

The curing step may be performed for a duration in the range of about 20 seconds to about 80 seconds, about 20 seconds to about 30 seconds, about 20 seconds to about 40 seconds, about 20 seconds to about 50 seconds, about 20 seconds to about 60 seconds, about 20 seconds to about 70 seconds, about 30 seconds to about 40 seconds, about 30 seconds to about 50 seconds, about 30 seconds to about 60 seconds, about 30 seconds to about 70 seconds, about 30 seconds to about 80 seconds, about 40 seconds to about 50 seconds, about 40 seconds to about 60 seconds, about 40 seconds to about 70 seconds, about 40 seconds to about 80 seconds, about 50 seconds to about 60 seconds, about 50 seconds to about 70 seconds, about 50 seconds to about 80 seconds, about 60 seconds to about 70 seconds, about 60 seconds to about 80 seconds, or about 70 seconds to about 80 seconds.

The use of the coating material as described above for nano-imprinting and the use of the coating material as described above in the method for making the anti-reflective material are two further aspects of the disclosure.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 is a schematic showing how (a) light will reflect and scatter if the structures have dimensions larger than the wavelength of light, but (b) a gradient refractive index (GRIN) is achieved if the structures have dimensions smaller than the wavelength of light.

FIG. 2 is a diagram of a double sided imprinted POSS resist on glass (204), including a high magnification illustration of the cone shaped nanostructures (202) protruding from the surface, which create a gradient of refractive index, depicted in the graph of, light path, plotted against, refractive index (n).

FIG. 3 is a schematic diagram of the cured coating material showing the organic component (302) and the inorganic component (304).

FIG. 4 shows a schematic diagram of how the coating material is imprinted and cured.

FIG. 5 shows SEM images of antireflective glass with the coating material imprinted with the moth's eye nanostructures. (A) shows the image with a scale bar of 1 μm, and (B) shows the image with a scale bar of 100 nm.

FIG. 6 shows a graph showing the reflectance of the antireflective glass when only one side of the glass is imprinted.

FIG. 7 shows a graph showing the transmittance of uncoated glass at different angles of incidents.

FIG. 8 shows a graph showing the transmittance of anti-reflective glass coated with the coating material on both sides at different angles of incidents.

EXAMPLES

Non-limiting examples of the invention and a comparative example will be further described in greater detail by reference to specific Examples, which should not be construed as in any way limiting the scope of the invention.

Example 1: Preparation of the Coating Material

Materials

Methacrylate POSS cage mixture (MA POSS) and acrylo POSS cage mixture (A POSS) were purchased from Hybrid Plastics (Hattiesburg, Miss., USA) in 2003. 1,6-hexanediole diacrylate (HDA), Pentanedioltetraacrylate (PTA), pentaerythritol tetrakis(3-mercaptopropionate) (PTM), Isobornyl acrylate (IBA) and 2-hydroxy-2-methylpropiophenone (initiator) were purchased from Sigma-Aldrich. Mono (methacryloxypropyl)-terminated polydimethylsiloxane (Siloxane oil) was purchest from Gelest Inc.

The coating material consists of polyhedral oligomeric silsesquioxane (POSS) with methacrylate side chains, diacrylate and tetraacrylate cross-linking molecules and a photoinitiator mixed in the ratio as described in the table below:

TABLE 1

| Component | Wt % |
|---|---|
| MA0735 methacrylate POSS cage (MA POSS) or MA0736 - Acrylo POSS (A POSS) Cage Mixture | 10-40 |
| 1,6-hexanediole diacrylate (HDA) | 0-65 |
| Pentanedioltetraacrylate (PTA) | 0-30 |
| 2-hydroxy-2-methylpropiophenone (initiator) | 2-10 |
| Pentaerythritol tetrakis(3-mercaptopropionate) (PTM) | 5-30 |

TABLE 1-continued

| Component | Wt % |
|---|---|
| Isobornyl acrylate (IBA) | 0-75 |
| Mono(methacryloxypropyl)-terminated polydimethylsiloxane (Siloxane oil) | 0-4 |

The methacrylate POSS cage (MA POSS) has the following structure:

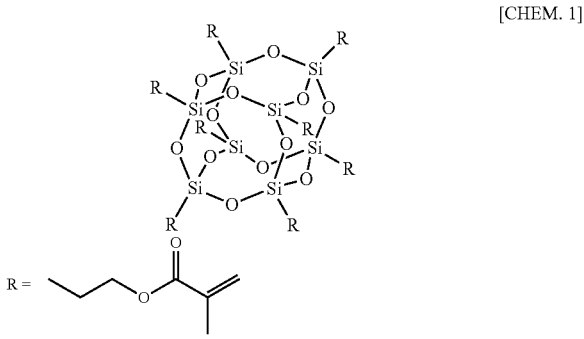

[CHEM. 1]

1,6-hexanediole diacrylate (HDA) has the following structure:

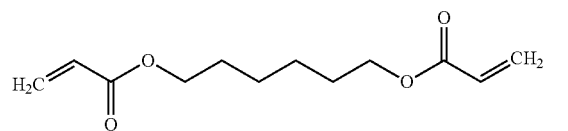

[CHEM. 2]

Pentaerythritol tetraacrylate (PTA) has the following structure:

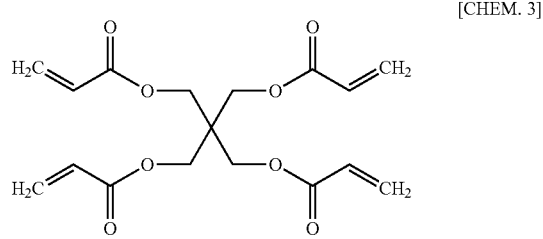 [SMILES: C=CC(=O)OCC(COC(=O)C=C)(COC(=O)C=C)COC(=O)C=C]

[CHEM. 3]

2-hydroxy-2-methylpropiophenone (initiator) has the following structure:

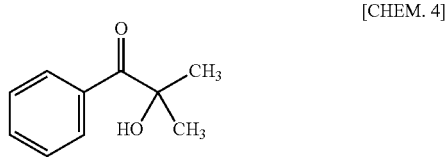

[CHEM. 4]

Acrylo POSS (A POSS) Cage Mixture has the following structure:

[CHEM. 5]

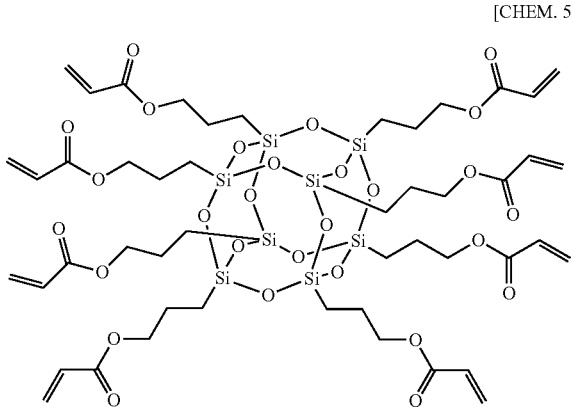 [SMILES: C=CC(=O)OCCC[Si]12O[Si]3(CCCOC(=O)C=C)O[Si]4(CCCOC(=O)C=C)O[Si](CCCOC(=O)C=C)(O1)O[Si]1(CCCOC(=O)C=C)O[Si](CCCOC(=O)C=C)(O2)O[Si](CCCOC(=O)C=C)(O3)O[Si](CCCOC(=O)C=C)(O4)O1]

Pentaerythritol tetrakis(3-mercaptopropionate) (PTM) has the following structure:

[CHEM. 6]

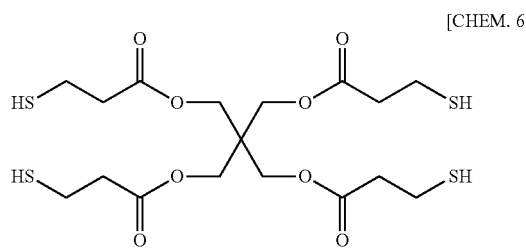

Isobornyl acrylate (IBA) has the following structure:

[CHEM. 7]

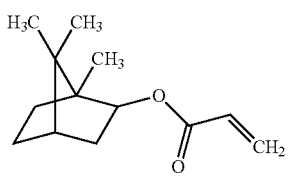

Mono(methacryloxypropyl)-terminated polydimethylsiloxane (Siloxane oil) has the following structure:

[CHEM. 8]

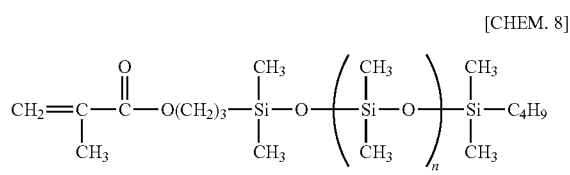

UV Curing

The resist was cured using a UVA (320 nm-390 nm) lamp for 30-60 s.

When MA0735 is mixed with the acrylic polymer, it bonds to the organic molecules and to one another, forming large chains that weave through the polymer, as shown in FIG. 3. In FIG. 3, 302 refers to the organic component and 304 refers to the inorganic component. The result is a nanostructured organic-inorganic hybrid polymer. The POSS chains act like nanoscale reinforcing fibres, which is expected to produce enhancements in mechanical strength and heat resistance.

Example 2: Nanolithography

Glass substrates, approximately 3 cm×3 cm, were cleaned by rinsing them with isopropyl alcohol (IPA) and blow dried using a stream of nitrogen. A small amount of resist (coating material) (ca. 0.02 mL) was applied, drop wise, to the middle of the clean glass substrate (low iron float glass having a thickness of 0.7 mm). A Ni mold with sub-wavelength structures (the structures having a pitch of about 250 nm, a height of about 300 to 350 nm and a peak-to-peak distance of about 290 nm) and a pre-applied anti-stick coating was then placed on top of the glass, sandwiching the liquid resist between the two solid layers, subsequently spreading the resist to the edges of the mold or substrate. The assembly was then placed under a UVA lamp (emitting wavelengths in the range of 320 nm to 390 nm) with the glass substrate on top, for up to 60 s. The mold was then removed from the substrate, yielding an imprinted coating of cured resist on the glass surface. To achieve a double sided glass coating, the process was simply repeated for both sides of the glass. A schematic depiction of the imprinted coating is shown in FIG. 2, where 202 refers to the nanostructured, POSS based coating and 204 refers to the glass substrate. A schematic depiction of how the coating is cured onto the substrate is shown in FIG. 4, where 402 refers to the glass, 404 refers to the coating material, 408 refers to the Ni mold, and 408 refers to a stage. The resin is subsequently cured by UV irradiation (410). The coating thickness was approximately 1000 nm.

Example 3: SEM Analysis

FIG. 5 shows the SEM images of the anti-reflective glass with the coating material imprinted with the moth's eye nanostructures. FIG. 5A is at ×2500 magnification (scale bar 10 μm), FIG. 5B is at ×10,000 magnification (scale bar 1 μm) and FIG. 5C is at ×100,000 magnification (scale bar 100 nm). FIG. 5D shows a schematic of how the structures are arranged on the coating. The formulation of the coating used to obtain the images in FIG. 5 was as follows: MA POSS (35 wt %), HDA (47 wt %), PTA (10 wt %), siloxane oil (4 wt %) and 2-hydroxy-2-methylpropiophenone (4 wt %). The SEM images were taken to confirm the successful imprinting of the nanostructures and to characterise the shape, size and geometry of the structures on the glass substrate. The SEM images were also taken to analyse the surface patterns for defects, of which none were detected. The samples demonstrated 100% yield.

Example 4: Pencil Hardness

Pencil hardness was tested on anti-reflective glass with the coating material imprinted with the moth's eye nanostructures. The glass substrate was a low iron float glass substrate having a thickness of 0.7 mm. The glass substrate was coated with the coating material and cured such that the coating thickness was about 1000 nm. The measurements were taken at 25° C. Hardness tests showed that a hardness of up to 8H was attainable, as shown in the table below.

In each of the experiments in Table 2, the amount of the other reagents in the composition were kept constant as follows: MA POSS (1.65 g), siloxane oil (0.2 g) and 2-hydroxy-2-methylpropiophenone (0.2 g).

TABLE 2

| HDA/g | PTA/g | HDA:PTA ratio | Acrylate linker (HDA + PTA):MA POSS ratio | Linker (HDA + PTA):MA POSS ratio | Pencil hardness |
|---|---|---|---|---|---|
| 3 | 0 | — | 3:1 | 12:1 | 3H |
| 2.25 | 0.75 | 1:3 | 3.75:1 | 12:1 | 3H |
| 2.25 | 0.375 | 1:6 | 3:1 | 10.5:1 | 5H |
| 1.5 | 1.5 | 1:1 | 4.5:1 | 12:1 | 3H |
| 1.5 | 0.75 | 1:2 | 3:1 | 9:1 | 7H |
| 0.75 | 1.125 | 3:2 | 3:1 | 7.5:1 | 8H |
| 0 | 3 | — | 6:1 | 12:1 | 6H |
| 0 | 1.5 | — | 3:1 | 6:1 | NA - too brittle |

1,6-hexanediol diacrylate (HDA) comprises two acrylate groups, pentaerythritol tetraacrylate (PTA) comprises four acrylate groups and MA POSS comprises eight methacrylate groups. The "Acrylate linker (HDA+PTA):MA POSS ratio" describes the ratio between the amount of acrylate groups in the HDA and PTA linkers combined, to the amount of methacrylate groups in POSS. The "Linker (HDA+PTA):MA POSS ratio" describes the ratio between the amount of HDA and PTA linkers combined, to the amount of MA POSS.

In each of the experiments in Table 3, the amount of the other reagents in the composition were kept constant as follows: 2-hydroxy-2-methylpropiophenone (4 wt %) and siloxane oil (2 wt %).

TABLE 3

| Reagents wt % | | | | |
|---|---|---|---|---|
| A POSS | HDA | PTM | IBA | Pencil Hardness |
| 28 | 57 | 9 | 0 | 6H |
| 31 | 42 | 21 | 0 | 8H |
| 21 | 60 | 13 | 0 | 7H |
| 18 | 0 | 9 | 67 | 3H |
| 13 | 0 | 9 | 72 | 2H |

Example 5: Reflection and Transmission

Reflection and transmission measurements were taken on anti-reflective glass with the coating material imprinted with the moth's eye nanostructures. The glass substrate was a low iron float glass substrate having a thickness of 0.7 mm. The glass substrate was coated with the coating material and cured such that the coating thickness was about 1000 nm. The measurements were taken at 25° C. The formulation of the coating used to obtain the reflection and transmission measurements was as follows: MA POSS (35 wt %), HDA (47 wt %), PTA (10 wt %), siloxane oil (4 wt %) and 2-hydroxy-2-methylpropiophenone (4 wt %). As shown in FIG. 6, reflectivity of up to 0.35% was observed. With regard to transmission, as shown in FIG. 7 and FIG. 8, it was found that transmission of up to 99.4% can be achieved in the visible light range. FIG. 7 shows the transmission of uncoated glass when the angle of incidence was 0 degrees (702), 45 degrees (704) and 67.5 degrees (706). FIG. 8 shows the transmission of glass that has been coated and imprinted on two sides, when the angle of incidence was 0 degrees (802), 45 degrees (804) and 67.5 degrees (806). A low reflection and high transmission is the main goal of anti-reflective coating. It can be seen from FIG. 7 and FIG. 8 that the transmission significantly improves when the glass is coated and imprinted on two sides.

TABLE 3

| Angle of incidence | Average transmission from 390 nm to 750 nm | |
|---|---|---|
| | Uncoated glass | 2 side imprinted glass |
| 0 | 91.3 | 98.7 |
| 45 | 89.2 | 96.4 |
| 25 | 90.9 | 92.3 |

Table 3 shows the improvement in light transmission over different angles of incidence. It can be seen that high transmission is maintained over a broad range of incident angles.

INDUSTRIAL APPLICABILITY

The coatings and the anti-reflective material of the present disclosure may find application in various optoelectronic equipment such as surface-emitting lasers, optical data storage, camera lenses, eyeglasses, flat panel displays and photovoltaics. The coatings and the anti-reflective material of the present disclosure may also have applications in aeronotical displays and sensors, automotive displays and sensors, space technologies and head-up display (HUD) devices as emitters and in displays.

The coatings may also be applied to soft substrates, creating a hard, non-scratch surface on softer polymer substrates.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A UV-curable coating material for a nanoimprint coating process comprising an organosilica compound having a UV-curable functional group and at least two UV-curable cross-linkers, wherein one UV-curable cross-linker is 1,6-hexanediol diacrylate at an amount in the range of 25 wt % to 70 wt % of the UV-curable coating material; and another UV-curable cross-linker(s) is pentaerythritol tetraacrylate and/or pentaerythritol tetrakis(3-mercaptopropionate) at an amount in the range of 2 wt % to 30 wt % of the UV-curable coating material, wherein the UV-curable functional group is selected from the group consisting of acrylate, alkyl methacrylate, alkyl acrylate, methacrylate, maleate, styrene, epoxy, vinyl ether, acrylopropyl, methyl methacrylate, ethyl methacrylate, propyl methacrylate, butyl methacrylate, pentyl methacrylate, methyl acrylate, ethyl acrylate, propyl acrylate, butyl acrylate, pentyl acrylate and any mixture thereof.

2. The coating material according to claim 1, wherein the nanoimprint coating process produces surface structures that are cone shaped with dimensions less than the wavelength of visible light or in the range of 100 nm to 390 nm.

3. The coating material according to claim 2, wherein the surface structures have a diameter in the range of 150 nm to 350 nm, a height in the range of about 250 nm to about 390 nm, and a peak-to-peak distance of about 250 nm to about 330 nm.

4. The coating material according to claim 1, comprising a photoinitiator.

5. The coating material according to claim 4, wherein the organosilica compound comprising the UV-curable functional group is present at an amount in the range of 5 to 45 wt %, the cross-linker is present in an amount in the range of 30 to 75 wt %, the photoinitiator is present at an amount in the range of 1 to 10 wt %, and wherein the total wt % of the coating material is 100%.

6. The coating material according to claim 1, wherein the organosilica compound is polyhedral oligomeric silsesquioxane (POSS) or octahedral oligomeric silsesquioxane.

7. The coating material according to claim 3, wherein the photoinitiator is selected from the group consisting of 2-hydroxy-2-methylpropiophenone, 1-hydroxycyclohexyl phenyl ketone, 2-methylbenzophenone, methyl benzoylformate, 3-methylbenzophenone and any mixture thereof.

8. A coating comprising an organosilica compound cross-linked by at least two UV-curable cross-linkers, wherein the coating comprises surface structures in the nano-sized range and wherein one UV-curable cross-linker is 1,6-hexanediol diacrylate at an amount in the range of 25 wt % to 70 wt % of the UV-curable coating material; and another UV-curable cross-linker(s) is pentaerythritol tetraacrylate and/or pentaerythritol tetrakis(3-mercaptopropionate) at an amount in the range of 2 wt % to 30 wt % of the UV-curable coating material, wherein the UV-curable functional group is selected from the group consisting of acrylate, alkyl methacrylate, alkyl acrylate, methacrylate, maleate, styrene, epoxy, vinyl ether, acrylopropyl, methyl methacrylate, ethyl methacrylate, propyl methacrylate, butyl methacrylate, pentyl methacrylate, methyl acrylate, ethyl acrylate, propyl acrylate, butyl acrylate, pentyl acrylate and any mixture thereof.

9. The coating according to claim 8, wherein the surface structures are cone shaped and have dimensions less than the wavelength of visible light or in the range of 100 nm to 390 nm.

10. The coating according to claim 8, wherein the organosilica compound is polyhedral oligomeric silsesquioxane (POSS) or octahedral oligomeric silsesquioxane.

11. An anti-reflective material comprising a substrate coated with the coating material for a nanoimprint coating process comprising an organosilica compound having a UV-curable functional group and at least two UV-curable cross-linkers, wherein one UV-curable cross-linker is 1,6-hexanediol diacrylate at an amount in the range of 25 wt % to 70 wt % of the UV-curable coating material; and another UV-curable cross-linker(s) is pentaerythritol tetraacrylate and/or pentaerythritol tetrakis(3-mercaptopropionate) at an amount in the range of 2 wt % to 30 wt % of the UV-curable coating material, wherein the UV-curable functional group is selected from the group consisting of acrylate, alkyl methacrylate, alkyl acrylate, methacrylate, maleate, styrene, epoxy, vinyl ether, acrylopropyl, methyl methacrylate, ethyl methacrylate, propyl methacrylate, butyl methacrylate, pentyl methacrylate, methyl acrylate, ethyl acrylate, propyl acrylate, butyl acrylate, pentyl acrylate and any mixture thereof.

12. The anti-reflective material according to claim 11, comprising an adhesion promoter or 3-(trimethoxysilyl) propyl methacrylate (TPMA) between the substrate and the coating material.

13. The anti-reflective material according to claim 11, wherein the organosilica compound having a UV-curable functional group and the at least two UV-curable cross-linkers of the coating material are cross-linked with covalent bonds.

14. The anti-reflective material according to claim 11, wherein the substrate is a glass sheet, and the coating material is coated on one side of the glass sheet or both sides of the glass sheet.

15. A method of making the anti-reflective material comprising a substrate coated with the coating material for a nanoimprint coating process comprising an organosilica compound having a UV-curable functional group and at least two UV-curable cross-linkers, wherein one UV-curable cross-linker is 1,6-hexanediol diacrylate at an amount in the range of 25 wt % to 70 wt % of the UV-curable coating material; and another UV-curable cross-linker(s) is pentaerythritol tetraacrylate and/or pentaerythritol tetrakis(3-mercaptopropionate) at an amount in the range of 2 wt % to 30 wt % of the UV-curable coating material, wherein the UV-curable functional group is selected from the group consisting of acrylate, alkyl methacrylate, alkyl acrylate, methacrylate, maleate, styrene, epoxy, vinyl ether, acrylopropyl, methyl methacrylate, ethyl methacrylate, propyl methacrylate, butyl methacrylate, pentyl methacrylate, methyl acrylate, ethyl acrylate, propyl acrylate, butyl acrylate, pentyl acrylate and any mixture thereof, comprising:
    providing a substrate;
    coating the substrate with the coating material;
    pressing a mold against the coating material to form a nano-sized imprint thereon; and
    curing with UV-radiation.

16. The method according to claim 15, comprising the step of coating the substrate with an adhesion promoter before coating with the coating material.

17. The method according to claim 15, wherein the mold imprints nanostructures on the coating material have dimensions less than the wavelength of visible light or in the range of 100 nm to 390 nm.

18. The method according to claim 15, wherein the substrate is a glass sheet and the coating material is coated on one side of the glass sheet or both sides of the glass sheet.

19. The method according to claim 15, wherein the curing step results in the organosilica compound having a UV-curable functional group and the at least two UV-curable cross-linkers of the coating material to cross-link with covalent bonds.

* * * * *